Feb. 19, 1952
E. F. SCHROEDER
2,586,485
ROLLER KEEL BOAT TRAILER
Filed Aug. 3, 1949
2 SHEETS—SHEET 1
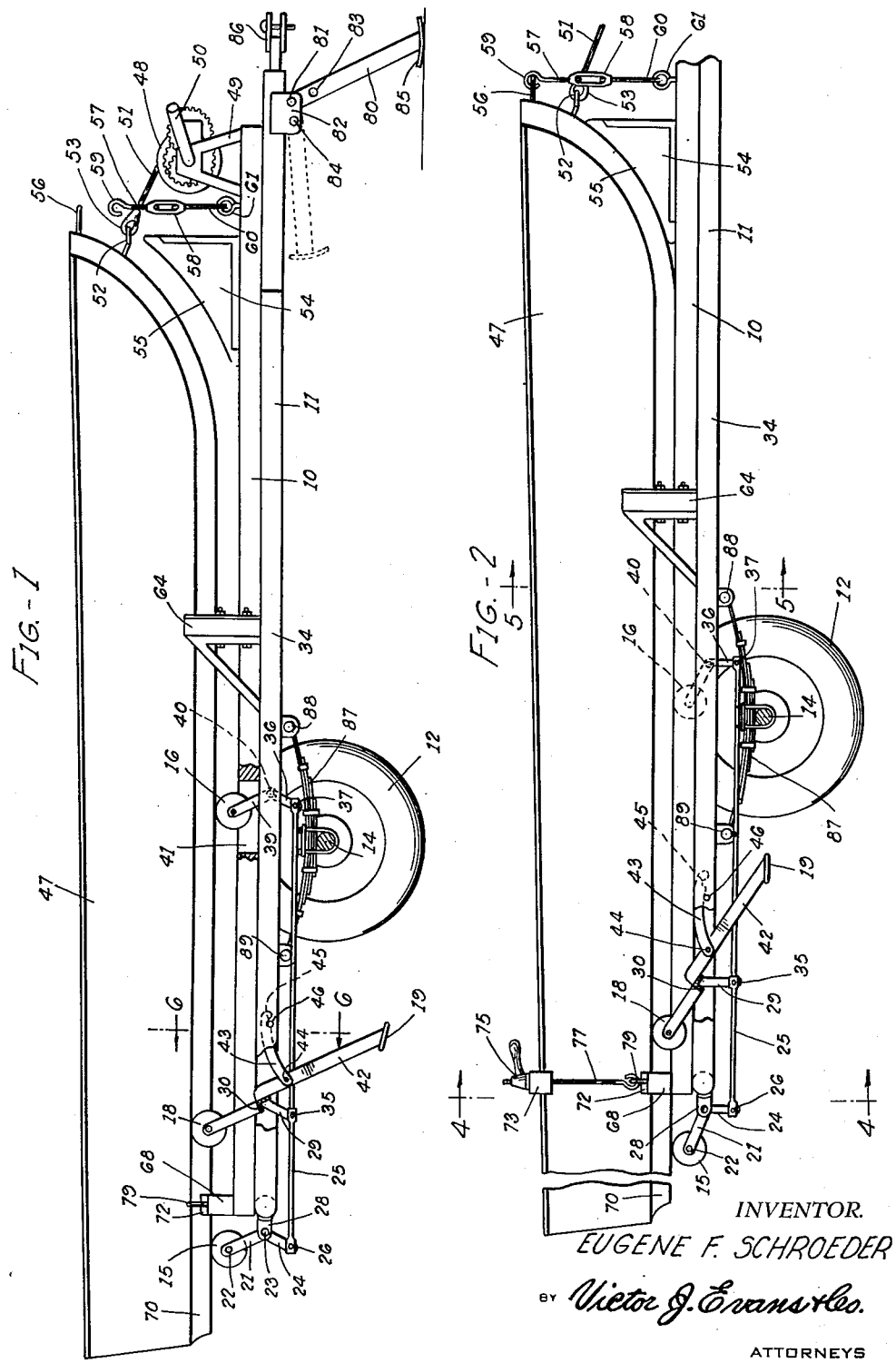
INVENTOR.
EUGENE F. SCHROEDER
BY Victor J. Evans & Co.
ATTORNEYS

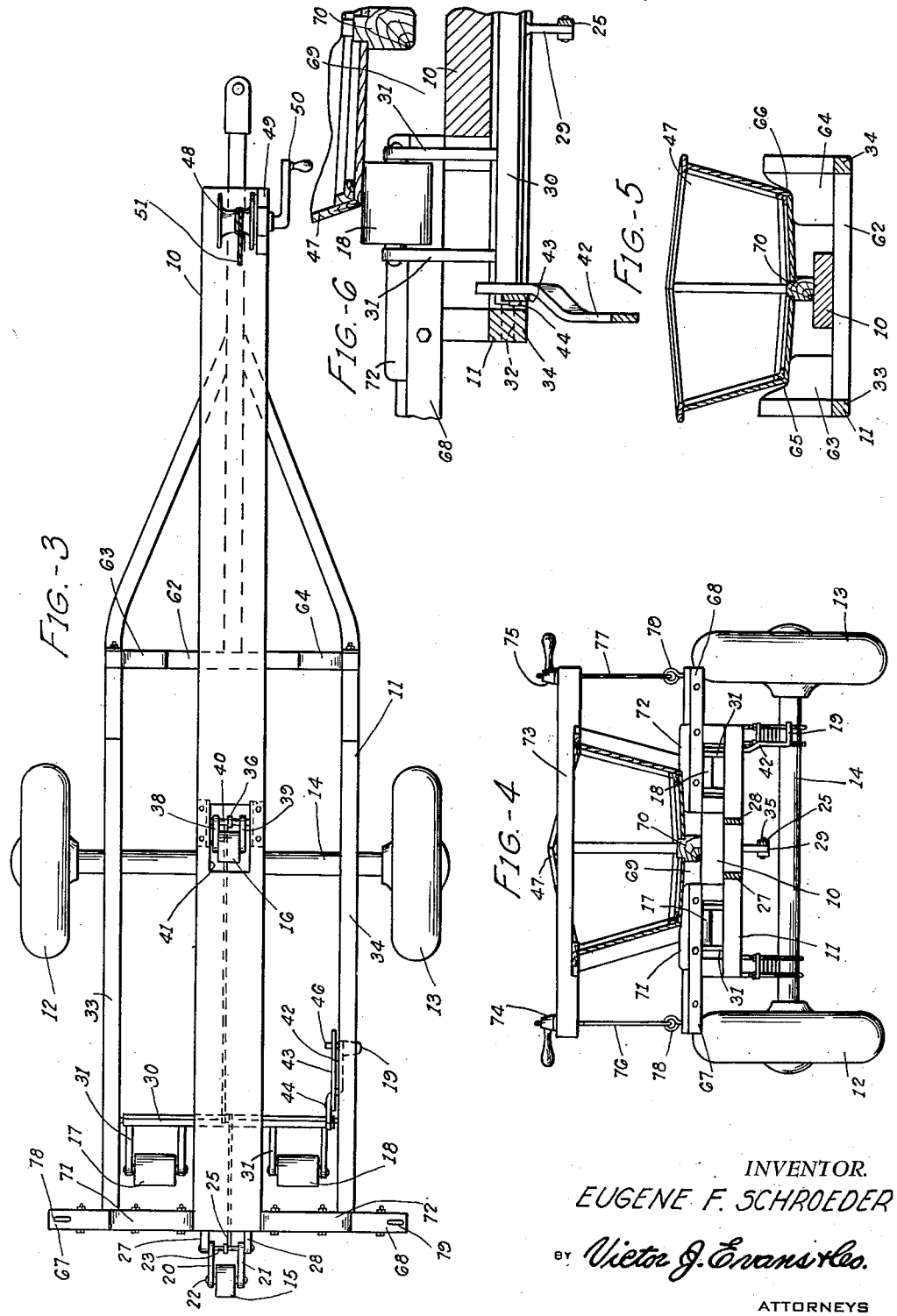

Patented Feb. 19, 1952

2,586,485

UNITED STATES PATENT OFFICE 2,586,485

ROLLER KEEL BOAT TRAILER

Eugene F. Schroeder, Lakeview, Iowa

Application August 3, 1949, Serial No. 108,376

3 Claims. (Cl. 214—65)

This invention relates to trailers for carrying small boats such as row boats, outboard motor boats and the like, and in particular a trailer having rollers adjustably mounted therein whereby the boat is supported on the rollers as it is being loaded upon or unloaded from the trailer and wherein the rollers drop to positions clear of the boat with the boat resting upon a centrally disposed beam and padded bolsters for traveling.

The purpose of this invention is to facilitate loading and unloading small boats upon and from a trailer so that a boat may be loaded upon or removed from a trailer by one man.

In the usual type of boat carrying trailer it is necessary to slide a boat endwise upon the frame or chassis of the trailer or pick the boat up and place it upon the trailer but as the average boat that is carried to and from fishing streams or lakes is made of comparatively light weight material it is objectionable to scrape the beam or lower edge of the keel on the frame of the trailer and with the trailer attached to a motor vehicle it is difficult to elevate a boat sufficiently to place it upon the trailer without scraping the keel or lower surface. With this thought in mind this invention contemplates a trailer in which disappearing rollers are provided at points of contact therein so that when a boat is being placed upon or removed from the trailer the rollers are elevated to suspend the boat above all stationary parts of the trailer.

The object of this invention is, therefore, to provide means for constructing a trailer for boats and the like wherein rollers are elevated for suspending a boat above stationary parts of the trailer as a boat is being removed from or placed upon the trailer and in which the rollers are dropped to positions within the trailer body when the boat is in traveling position thereon.

Another object of the invention is to provide a boat trailer having disappearing rollers incorporated in the upper surface in which means is provided for positively clamping a boat against rigid elements of the trailer when the boat is in the carrying position.

Another object of the invention is to provide a boat carrying trailer having disappearing rollers therein positioned to engage the boat in which the parts are readily actuated by one man.

A further object of the invention is to provide a boat carrying trailer having disappearing rollers therein with means for clamping the boat to the trailer, which is of a comparatively simple and economical construction.

With these and other objects and advantages in view the invention embodies a substantially horizontally disposed chassis having a centrally disposed keel receiving beam with bolsters at the sides, a windlass and a turnbuckle actuated hook at the forward end and having rollers incorporated in the surface with means for actuating the rollers to positions for suspending a boat above the chassis of the trailer to facilitate loading and unloading the boat.

Other features and advantages of the invention will appear from the following description taken in connection with the drawings wherein:

Figure 1 is a view showing a side elevation of the trailer illustrating a boat being loaded upon the trailer with the boat suspended by the rollers and almost in the carrying position on the trailer.

Figure 2 is a similar view with part of the boat broken away showing the rollers dropped and the boat in the position for traveling.

Figure 3 is a plan view of the trailer with the boat removed.

Figure 4 is cross section through the rear part of the trailer taken on line 4—4 of Figure 2 and showing the clamping means for the stern of the boat.

Figure 5 is a cross section through the trailer taken on line 5—5 of Figure 2 and showing the bolsters at the sides upon which the sides of the boat rest.

Figure 6 is a similar section taken on line 6—6 of Figure 1 with parts broken away illustrating the lower edge of one side of a boat resting upon one of the rollers.

Referring now to the drawings wherein like reference characters denote corresponding parts the trailer of this invention includes a centrally disposed longitudinally extended keel contacting plank or beam 10 mounted on a chassis 11 with wheels 12 and 13 on an axle 14, a rear keel engaging roller 15, a forward keel engaging roller 16, side rollers 17 and 18, and suitable operating instrumentalities for the rollers actuated by a foot pedal 19.

The roller 15 is rotatably mounted in the outer ends of arms 20 and 21 by a shaft 22 and the arms are carried by a shaft 23 with a crank 24 extended downwardly therefrom and pivotally attached to a bar 25 by a pin 26. The rod 23 is pivotally mounted in outwardly extended arms 27 and 28 at the rear of the chassis and as the bar 25 is forced rearwardly the roller 15 is elevated to the position shown in Figure 1.

The bar 25 is also pivotally attached to a crank 29 that extends downwardly from a shaft 30 and the rollers 17 and 18 are carried by the shaft, being rotatably mounted in the outer ends of arms 31 extended outwardly from the shaft. The shaft 30 is provided with extended ends 32 through which it is journaled in side members 33 and 34 of the chassis 11, as illustrated in Figure 6.

The bar 25 is pivotally attached to the crank 29 by a pin 35 and the forwardly extended end of the bar is attached to a crank 36 of the roller 16 by a pin 37. The roller 16 is rotatably mounted in the outer ends of arms 38 and 39, similar to the arms 27 and 28 and the arms are carried by a rod 40 from which the crank 36 extends. The roller 16 extends upwardly through an opening 41 in the beam 10, as illustrated in Figures 1 and 3 and in Figure 1 a portion of the beam 10 is broken away illustrating the position of the roller with the crank and arms therein.

Shaft 30 is also provided with a foot lever 42, on the lower end of which the pedal 19 is carried and with the foot lever forced downwardly from the position shown in Figure 2 to that shown in Figure 1 the rollers are actuated to elevated positions shown in Figure 1. A latch 43 is pivotally mounted on the foot lever 42 by a pin 44 and the outer end of the latch is provided with a notch 45 that is positioned to snap over a pin 46 for locking the foot lever 42 downwardly with the rollers elevated whereby a boat as indicated by the numeral 47 is suspended in an elevated position above the stationary parts of the trailer.

The forward end of the beam 10 of the chassis 11 is provided with a windlass 48 which is journaled on a stand 49 and provided with a crank 50, and a cable 51 extends from the windlass and over the trailer so that it may be attached to an eye 52 on the bow of the boat. The end of the cable is provided with a clevis 53 that may be hooked into the eye 52 so that the boat may be drawn upon the trailer by the windlass and after it is in position it may be rigidly secured to the trailer, particularly at the forward end, by the cable and windlass.

The beam 10 is also provided with a block 54 that may have a cushion surface 55 to receive the keel at the bow of the boat and the bow may also be provided with an eye 56 through which the bow of the boat may be clamped in place by an attachment 57 having a turnbuckle 58 therein and having hooks 59 and 60 at the ends, the hook 60 being held in an eye 61 on the beam 10.

The forward part of the chassis is also provided with a cross beam 62 having bolsters 63 and 64 on the ends thereof and the inner boat contacting surfaces 65 and 66, respectively are padded to prevent marring the sides of the boat.

A transverse beam is provided at the rear of the trailer and this beam is provided in sections 67 and 68 with a gap 69 between the inner ends of the sections through which the keel 70 of the boat passes. The upper surfaces of the sections 67 and 68 are provided with pads 71 and 72, respectively upon which the under surface of the boat is clamped by a beam 73 that rests upon the gunwales and the beam 73 is clamped to the sections 67 and 68 by clamp nuts 74 and 75 on threaded upper ends of rods 76 and 77, respectively, the lower ends of the rods being carried by eyes 78 and 79 on the ends of the sections of the transverse beam.

The forward end of the chassis is provided with a support 80 pivotally mounted by a pin 81 in a bracket 82 and the support is provided with an opening 83 that is positioned to register with openings 84 in the bracket so that the supports may be held in the positions indicated by the dotted lines while traveling. The lower end of the support is provided with a shoe 85 to provide sufficient bearing surface for supporting the forward end of the trailer. The forward end of the trailer is also provided with a clevis 86 by which it may be attached to a motor vehicle or the like.

The axle of the wheels 12 and 13 is attached to the chassis by springs 87, the ends of which are attached to the lower surfaces of the side beams of the chassis by sockets 88 and 89.

With the parts arranged in this manner a boat is readily unloaded from the trailer by backing the trailer into the water with the axle 14 substantially at the surface of the water and with the turnbuckle and beam or bolster 73 released the boat is elevated until it is suspended on the rollers by pressing downwardly on the foot pedal 19 whereby the cable may be slacked down on the winch so that the boat rolls rearwardly into the water, and when it is desired to replace the boat on the trailer the trailer is correspondingly positioned and with the bow of the boat connected to the cable, and with the rollers extended upwardly, the boat is readily drawn upon the trailer by the winch until it arrives at the position illustrated in Figure 1, and at this time the latch 43 may be released whereby the weight of the boat actuates the rollers to the downward position and the boat is secured in position by the attachment 57 with the stern being clamped by the bolster 73 and clamp nuts 74 and 75.

It will be understood that modifications may be made in the design and arrangement of the parts without departing from the spirit of the invention.

What is claimed is:

1. In a boat carrying trailer, the combination which comprises a chassis mounted on wheels, a beam mounted on the chassis and positioned to receive the keel of a boat, bolsters positioned on the chassis for engaging the sides of a boat positioned on the keel, rollers journaled in the ends of arms pivotally mounted in the chassis, a foot pedal journaled on a transversely disposed shaft in the chassis, a rod extended longitudinally of the chassis, a crank connecting the rod to the foot pedal, cranks connecting the rod to the arms of the rollers for actuating the rollers to elevated positions for suspending a boat above the chassis, a latch for locking the rollers in the elevated positions, said latch adapted to be operated for releasing the rollers, means clamping the boat on the chassis, and means securing the boat on the trailer for traveling.

2. In a boat carrying trailer, the combination which comprises a chassis mounted on wheels, a beam mounted on the chassis and positioned to receive the keel of a boat, bolsters positioned on the chassis for engaging the sides of a boat positioned on the beam, rollers journaled in the ends of arms pivotally mounted in the chassis, a foot pedal journaled on a transversely disposed shaft in the chassis, a rod extended longitudinally of the chassis, a crank connecting the rod to the foot pedal, cranks connecting the rod to the arms of the rollers for actuating the rollers to elevated positions for suspending a boat above the chassis, a latch for locking the rollers in the elevated positions, said latch adapted to be operated for releasing the rollers, and means clamping the boat on the chassis, a windlass having a cable mounted on the forward end of the chassis for drawing a boat on the trailer and over the rollers thereof, and means securing the boat on the trailer for traveling.

3. In a boat carrying trailer, the combination which comprises a chassis mounted on wheels, a beam mounted on the chassis and positioned to receive the keel of a boat, bolsters positioned on the chassis for engaging the sides of a boat positioned on the beam, disappearing rollers pivotally mounted in the chassis, a foot pedal for actuating the rollers to elevated positions for suspending a boat above the chassis, a latch for locking the rollers in the elevated positions, said latch adapted to be operated for releasing the rollers, means clamping the boat on the chassis, a windlass having a cable mounted on the forward end of the chassis for drawing a boat on the trailer and over the rollers thereof, an attachment having a turnbuckle therein positioned on the forward end of the chassis for clamping the bow of the boat to the chassis, and a bolster extended across the gunwales of the boat having clamping nuts for holding the bolster downwardly with the boat clamped against the chassis and with the clamping nuts threaded on rods extended upwardly from the chassis and positioned at the sides of the boat.

EUGENE F. SCHROEDER.

REFERENCES CITED

The following references are of record in the file of this patent:

UNITED STATES PATENTS

| Number | Name | Date |
| --- | --- | --- |
| 141,098 | Abeel | July 22, 1873 |
| 559,552 | Turner | May 5, 1896 |
| 1,658,770 | Murray et al. | Feb. 7, 1928 |
| 2,116,150 | Howie et al. | May 3, 1938 |
| 2,361,951 | Livermon | Nov. 7, 1944 |
| 2,442,248 | Sampsell | May 25, 1948 |
| 2,448,443 | Krake | Aug. 31, 1948 |
| 2,496,599 | Rivers | Feb. 7, 1950 |

FOREIGN PATENTS

| Number | Country | Date |
| --- | --- | --- |
| 496,549 | Great Britain | Nov. 28, 1938 |